United States Patent [19]

Abels et al.

[11] Patent Number: 4,768,606
[45] Date of Patent: Sep. 6, 1988

[54] HYDRAULIC CYLINDER MACHINE COMPONENTS

[75] Inventors: Theodor Abels, Aschaffenburg; Gunter Honecker, Seligenstadt, both of Fed. Rep. of Germany

[73] Assignee: Linde Aktiengesellschaft, Wiesbaden, Fed. Rep. of Germany

[21] Appl. No.: 41,981

[22] Filed: Apr. 24, 1987

[30] Foreign Application Priority Data

May 16, 1986 [DE] Fed. Rep. of Germany ....... 3616685

[51] Int. Cl.⁴ .............................................. B62D 5/10
[52] U.S. Cl. ...................................... 180/155; 92/161
[58] Field of Search ............... 180/154, 155, 156, 157, 180/159, 160, 161, 163; 92/161, DIG. 1

[56] References Cited

U.S. PATENT DOCUMENTS

| 1,389,001 | 8/1921 | Hilton | 92/161 |
| 3,785,252 | 1/1974 | Cornair | 92/161 |
| 4,046,218 | 9/1977 | Blaisdell et al. | 180/155 |

Primary Examiner—John A. Pekar
Attorney, Agent, or Firm—Thomas R. Shaffer

[57] ABSTRACT

A machine component, such as a steering axle is provided as an elongate member having a hydraulic cylinder connected thereto intermediate the ends of the elongate member, said cylinder having an end plate at each end, a piston in said cylinder with piston rods extending from each end of said cylinder through said end plates and pivots supporting each of said end plates on said elongate member whereby said end plates may pivot by a small amount around said pivots.

5 Claims, 2 Drawing Sheets

HYDRAULIC CYLINDER MACHINE COMPONENTS

This invention relates to hydraulic cylinder machine components and particularly to a machine component having a hydraulic cylinder operatively connected therewith having a piston and piston rod displaceable therein and two spaced cylinder end plates, each pivotally supported about an axis transverse to the length of the machine component and operatively connected to the cylinder and piston assembly.

Such a machine component is a steering cylinder with piston rods projecting out on both sides, located centrally in the steering axle which are known in the case of steering axles of fork lifts, construction machines and other vehicles. These steering cylinders are either integrated into the steering axle body, the cylinder bore is inserted directly into the steering axle body, or the cylinder is prepared separately and bolted as a unit to the axle body.

In most such cases, the force does not act precisely coaxially to the piston rod axis, but encloses a more or less acute angle with the latter. This is the case, e.g., in steering axles if the connecting link between steering lever and piston rod assumes and angle that differs as a function of the maximum angle of turn. If this force acts in a direction that is at an angle to the piston rod axis, elastic deformations of the piston rod occur under the effect of the force. Even if the latter are slight, side pressures occur in the guide in the cylinder covers in the case of a cylinder rigidly bolted to the machine component. Another disadvantage is that stresses readily arise in the cylinder due to the bolting of the cylinder to the machine component, e.g., the steering axle body, or if the cylinder is a direct component of the body, the cylinder is deformed together with this body.

The invention proposes to eliminate the said shortcomings, to simplify the processing of the machine component, e.g., steering axle body, and the production and assembly of the cylinder and to reduce the perturbing influences due to lateral forces.

This problem is solved in that each of the two cylinder and plates is pivotally supported around an axis, i.e., tiltable by a small angle in the machine component, e.g., the steering axle body. Stresses in the cylinder and side pressures on the cylinder end plates are thus avoided. The cylinder does not need to be first assembled and bolted on, but can be put together directly during the assembly of the overall unit, e.g., the steering axle body. The assembly expenses during the production and in the replacement of worn seals are low.

One particular advantage results if each of the two axes around which a cylinder end plate is pivotable is defined by a borehole in the machine component, which preferably is an axle box, and these two boreholes are mutually parallel and in the case of a steering axle parallel to the axle bearing journal boreholes. Then all the boreholes can be produced in one setting on a machine that has only one drilling spindle or in which all the drilling spindles are parallel to each other. The tiltable support around an axis can be obtained by balls that are supported in hollow conical recesses, or by conical journals that engage in conical recesses, or by cylindrical journals that are supported in corresponding boreholes.

The two cylinder end plates are easy to produce, easier than a complete cylinder. The cylinder tube proper can be a commercial ready-made HP tube, in which no processing is required other than cutting to length and deburring at the end edges. The cylinder can thus be inexpensively produced with little cost from inexpensive material. The fluid feed is through the cylinder end plates. The two cylinder end plates can be identical so that they can be mass-produced. In order to prevent the cylinder tube from being shoved to and fro by a small amount on the sealing rings under the action of the frictional forces of the piston between the two cylinder end plates, it is preferred to provide a slight prestressing and thus to incorporate the two end plates in the machine component, preferably a steering axle body, so that the impact edges of the two cylinder end plates against which the cylinder tube rests have a spacing between each other that is smaller by a certain amount, corresponding to the prestressing desired, than the length of the cylinder tube in the unincorporated state.

Preferably the cylinder is a dual acting cylinder from which the piston rod moves out toward both sides sectively. The pivoting axis around which a cylinder end plate is pivoted intersects the axis of the piston rod in a preferred embodiment. Preferably each of the two axes around which the cylinder end plates are pivotable are defined by a borehole in the axle housing and are parallel to each other and to the axle bearing journal boreholes. Preferably the component is a steering axle having a conical borehole provided in each cylinder end plate on each side and a conical recess in the housing with a bolt screwed into threads in the housing borehole and a ball in each opposite conical recess. Preferably tiltable bearing points are formed around an axis by conical prelongations that engage in conical recesses of the opposite component.

In the foregoing general description certain objects, purposes and advantages of this invention have been set out. Other objects, purposes and advantages of the invention will be apparent from a consideration of the following description and the accompanying drawings in which.

Figure 1:
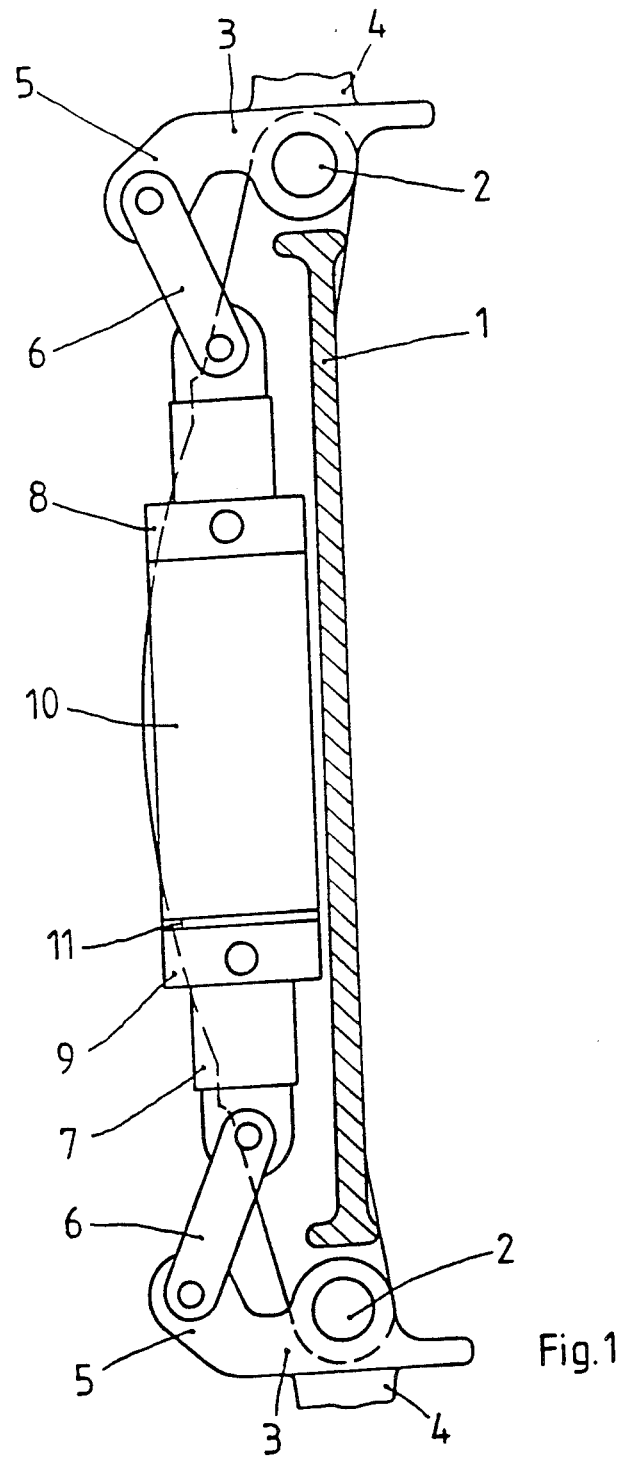
FIG. 1 shows a top plan view of a steering axle body having a steering cylinder incorporated thereon in accordance with this invention.
Figures 2, 3:
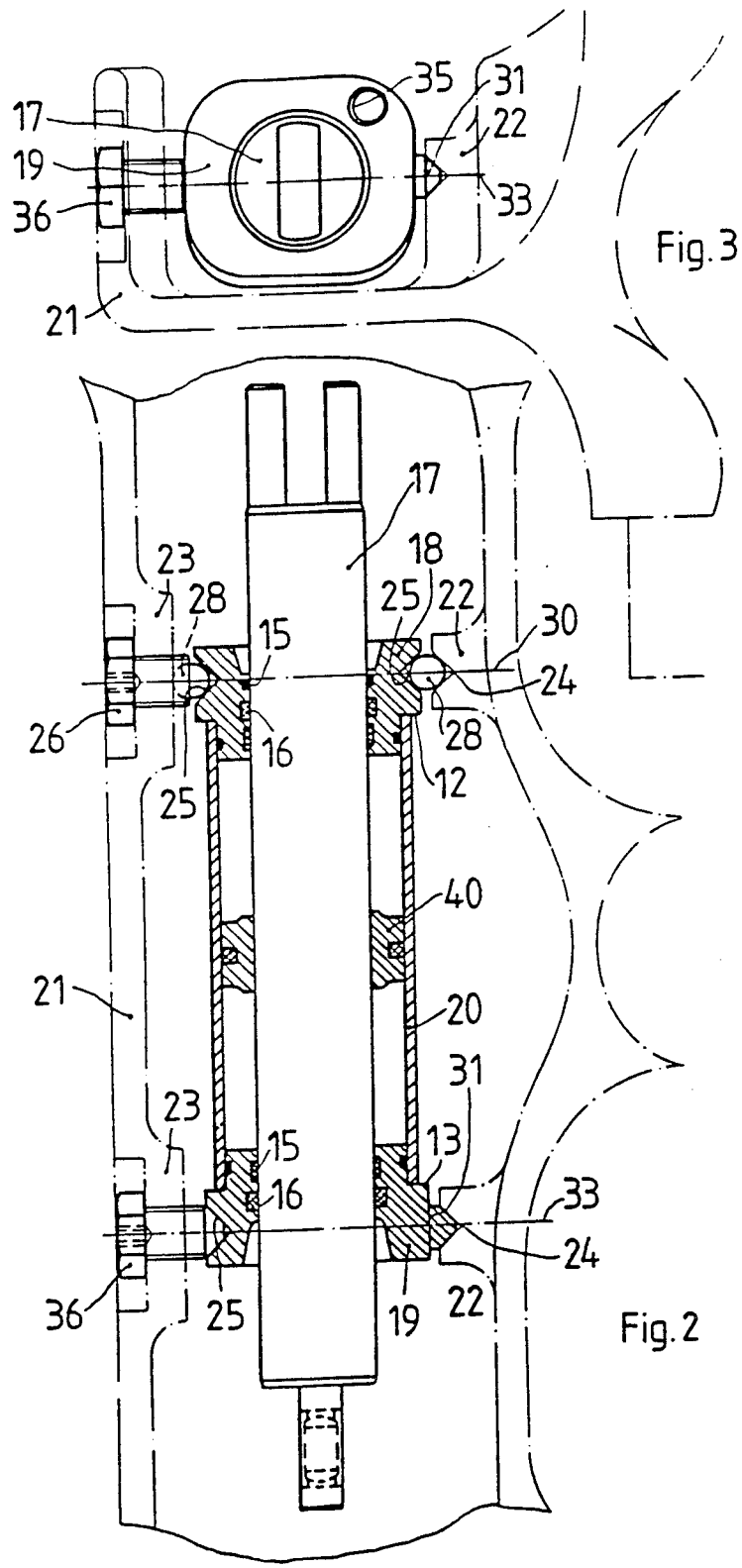
FIG. 2 shows a rear view of an axial cross section of a steering cylinder incorporated in another axle body.
FIG. 3 shows the steering cylinder according to FIG. 2 in a side view, i.e., in the direction of the piston axis.

Referring to FIG. 2, we have shown the different embodiments possible in the two halves lying to the left and to the right of the symmetry plane.

In the axle body 1 two axle bearing journal bolts 2 are supported in corresponding boreholes. An axle bearing component 3, which carries the axle bearing journal 4, is supported on each axle bearing journal bolt 2. This component 3 also has a steering lever 5, to which the piston rod 7 of the steering cylinder-piston unit is articulated. The steering cylinder consists of two end plates 8 and 9 and a cylinder tube 11. An elastic intermediate ring 11 is located between one end of the steering cylinder tube 10 and the cylinder end plate 9. Each of the cylinder end plates 8 and 9 is pivotably supported in the axle body 1 around an axis perpendicular to the plane of the drawing.

In the embodiment according to FIG. 2, the steering cylinder consists of the two cylinder end plates 18 and 19 and a cylinder tube 20, which is supported in the steering axle body 21.

An impact annular surface 12 is provided on the cylinder end plate 18 and an impact annular surface 13 is provided on the cylinder end plate 19, where the cylinder tube 20 is clamped between these two annular impact surfaces 12 and 13. The piston rod 17 is sealed in the two cylinder end plates 18 and 19 by an O-ring 16 and a sealing ring 15.

Two projections 22 are provided in a first side of the steering axle housing 21 and two projections 23 are opposite them at the under second side of the steering axle body. A conical recess 24 is provided in each of the projections 22 and a threaed borehole is provided in each of the projections 23.

The axis of a conical recess 24 in a projection 22 and the axis of the corresponding threaded hole in the projection 23 are aligned with each other.

The two cylinder end plates 18 and 19 differ as follows: conical recesses 25 are provided in a first side of the cylinder end plate and they correspond to the conical recesses 24. Accordingly, a hollow suitable for receiving a ball is provided at the end of the bolt 26 that is inserted into the threaded hold of the projection 23. A ball 28 is placed between the conical recesses 24 and 25. A ball 28 is also placed between the end surface of the bolt 26 and the conical borehole 25 on the second side of end plate 18. A pivoting axis 30, around which the cylinder end plate 18 is pivotable, i.e., tiltable, by a small amount, thus passes through the midpoints of the two balls 28.

In contrast, a conical prolongation 31 is provided on a first side of the cylinder end plate 19 which fits into the conical recess 24. In this case, a bolt 36 that has a conical tip that fits precisely into the conical recess 25 of the second side of end plate 19 is bolted into the threaded hole of the projection 23. In this case, a pivoting axis 33 is defined by the conical prolongation 31 and recess 24 on the side of the projection 22 and the conical recess 25 and the tip of the bolt 36 on the side of the projection 23; the cylinder end plate 19 is slightly pivotable around this axis 33. A fluid feed hole 35 through which fluid can pass into the cylinder space in the cylinder tube 20 between the cylinder end plate 19 and the piston 40 is provided in the cylinder end plate 19. A corresponding borehole (not shown in the drawing) is provided in the cylinder end plate 18. Fluid from a convention source and control system is delivered and withdrawn through these boreholes to control the movement of piston 40.

In the foregoing specification, we have set out certain preferred practices and embodiments of this invention, however, it will be understood that this invention may be otherwise embodied within the scope of the following claims.

We claim:

1. A steering axle of a vehicle comprising an axle housing having a pair of spaced apart conical recesses provided in a first side thereof and a pair of spaced apart threaded bores provided in a second side thereof, each of said threaded bores having a bolt screwed therein, a hydraulic steering cylinder connected to said housing intermediate the ends thereof, said cylinder having an end plate at each end, a piston within said cylinder with piston rods extending from each end of said cylinder through said end plates, said end plates mounted within said housing whereby each of said end plates may pivot by a small amount around one of two spaced apart, substantially parallel axes, said axes defined by said pair of spaced apart conical recesses provided in a first side of said housing and by said spaced-apart threaded bores, said end plates each having a first side aligned with one of said conical housing recesses and a second side aligned with one of said threaded bores, and at least one end plate having a conical recess with a ball provided between end plate recess and aligned conical housing recess.

2. A steering axle of a vehicle comprising an axle housing having a pair of spaced apart conical recesses provided in a first side thereof and a pair of spaced apart threaded bores provided in a second side thereof, each of said threaded bores having a bolt screwed therein, a hydraulic steering cylinder connected to said housing intermediate the ends thereof, said cylinder having an end plate at each end, a piston within said cylinder with piston rods extending from each end of said cylinder through said end plates, said end plates mounted within said housing whereby each of said end plates may pivot by a small amount around one of two spaced apart, substantially parallel axes, said axes defined by said pair of spaced apart conical recesses provided in a first side of said housing and by said spaced-apart threaded bores, said end plates each having a first side aligned with one of said conical housing recesses and a second side aligned with one of said threaded bores, said first side of at least one end plate having a conical prolongation adapted for insertion into one of said conical housing recesses.

3. A steering axle of a vehicle comprising an axle housing having a pair of spaced apart conical recesses provided in a first side thereof and a pair of spaced apart threaded bores provided in a second side thereof, each of said threaded bores having a bolt screwed therein, a hydraulic steering cylinder connected to said housing intermediate the ends thereof, said cylinder having an end plate at each end, a piston within said cylinder with piston rods extending from each end of said cylinder through said end plates, said end plates mounted within said housing whereby each of said end plates may pivot by a small amount around one of two spaced apart, substantially parallel axes, said axis defined by said pair of spaced apart conical recesses provided in a first side of said housing and by said spaced-apart threaded bores, said end plates each having a first side aligned with one of said conical housing recesses and a second side aligned with one of said threaded bores, and at least one of said bolts having an end adapted to receive a ball which is provided between said end and a conical recess provided in the second side of each end plate.

4. A steering axle of a vehicle comprising an axle housing having a pair of spaced apart conical recesses provided in a first side thereof and a pair of spaced apart threaded bores provided in a second side thereof, each of said threaded bores having a bolt screwed therein, a hydraulic steering cylinder connected to said housing intermediate the ends thereof, said cylinder having an end plate at each end, a piston within said cylinder with piston rods extending from each end of said cylinder through said end plates, said end plates mounted within said housing whereby each of said end plates may pivot by a small amount around one of two spaced apart, substantially parallel axes, said axes defined by said pair of spaced apart conical recesses provided in a first side of said housing and by said spaced-apart threaded bores, said end plates each having a first side aligned with one of said conical housing recesses and a second side aligned with one of said threaded bores, at least one of said bolts having a conical tip adapted for insertion into one of said second side conical recesses of said end plates.

5. A steering axle according to claim 1 or 2 or 3 or 4 wherein the spacing of said two end plates from each other in the unincorporated state of the cylinder is greater by a definite small amount, suitable for producing a prestressing, than the spacing of the two threaded boreholes in said housing.

\* \* \* \* \*

UNITED STATES PATENT AND TRADEMARK OFFICE
CERTIFICATE OF CORRECTION

PATENT NO. : 4,768,606

DATED : September 6, 1988

INVENTOR(S) : Theodor Abels et al.

It is certified that error appears in the above-identified patent and that said Letters Patent is hereby corrected as shown below:

Coumn 3, line 14, change "threaed" to --threaded--.

Signed and Sealed this

Seventh Day of March, 1989

Attest:

DONALD J. QUIGG

Attesting Officer

Commissioner of Patents and Trademarks